(12) United States Patent
Janson et al.

(10) Patent No.: US 10,767,742 B2
(45) Date of Patent: Sep. 8, 2020

(54) TRANSAXLE HAVING CHAIN FINAL DRIVE

(71) Applicant: Ford Global Technologies, LLC, Dearborn, MI (US)

(72) Inventors: David Allen Janson, Plymouth, MI (US); Gregory Daniel Goleski, Rochester Hills, MI (US); David Gon Oh, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 786 days.

(21) Appl. No.: 15/372,742

(22) Filed: Dec. 8, 2016

(65) Prior Publication Data

US 2018/0163835 A1 Jun. 14, 2018

(51) Int. Cl.
| | |
|---|---|
| *F16H 37/08* | (2006.01) |
| *F16H 57/021* | (2012.01) |
| *F16H 57/035* | (2012.01) |
| *F16H 3/66* | (2006.01) |
| *B60K 17/04* | (2006.01) |
| *F16H 57/033* | (2012.01) |
| *F16H 57/037* | (2012.01) |
| *F16H 7/06* | (2006.01) |
| *B60K 17/16* | (2006.01) |
| *B60K 17/342* | (2006.01) |
| *B60K 17/08* | (2006.01) |
| *B60K 17/10* | (2006.01) |
| *F16H 57/02* | (2012.01) |

(52) U.S. Cl.
CPC ......... *F16H 37/0813* (2013.01); *B60K 17/04* (2013.01); *B60K 17/08* (2013.01); *B60K 17/105* (2013.01); *B60K 17/16* (2013.01); *B60K 17/342* (2013.01); *F16H 3/66* (2013.01); *F16H 7/06* (2013.01); *F16H 57/021* (2013.01); *F16H 57/033* (2013.01); *F16H 57/035* (2013.01); *F16H 57/037* (2013.01); *F16H 2057/02052* (2013.01); *F16H 2200/006* (2013.01); *F16H 2200/2012* (2013.01); *F16H 2200/2046* (2013.01); *F16H 2200/2066* (2013.01); *F16H 2200/2082* (2013.01)

(58) Field of Classification Search
None
See application file for complete search history.

(56) References Cited

U.S. PATENT DOCUMENTS 3,986,413 A * 10/1976 Stockton ............... F16H 47/085
475/54
6,155,364 A 12/2000 Nagano et al.
(Continued)

FOREIGN PATENT DOCUMENTS

WO 2015097510 A1 7/2015

*Primary Examiner* — Colby M Hansen
(74) *Attorney, Agent, or Firm* — Vincent Mastrogiacomo; Brooks Kushman P.C.

(57) ABSTRACT

A transmission uses a chain and sprocket final drive that provides all final drive torque multiplication in addition to transferring power to the differential axis. The transmission includes a front support structure that provides for a small driving sprocket. The front support includes an insert made of hardened material that can serve as the inner bearing race for the driving sprocket. In some embodiments, four fluid passageways are provided to the torque converter. In some embodiments, the park gear may be integrated with the driven sprocket.

19 Claims, 8 Drawing Sheets

(56) References Cited

U.S. PATENT DOCUMENTS

| | | |
|---|---|---|
| 6,354,974 B1 | 3/2002 | Kozarekar |
| 7,841,960 B2 | 11/2010 | Baldwin |
| 8,491,432 B2 | 7/2013 | Radermacher et al. |
| 8,517,882 B2* | 8/2013 | Wenthen ................ B60K 17/06 |
| | | 475/213 |
| 8,562,476 B2* | 10/2013 | Simpson ............... F16H 37/082 |
| | | 475/213 |
| 9,175,759 B2 | 11/2015 | Iwase et al. |
| 2009/0011892 A1* | 1/2009 | Nishida ............... F16D 25/0638 |
| | | 475/276 |
| 2011/0098151 A1 | 4/2011 | Ziemer |
| 2016/0193908 A1 | 7/2016 | Kanada et al. |
| 2017/0130812 A1* | 5/2017 | Maurer ................... F16H 45/02 |

* cited by examiner

TRANSAXLE HAVING CHAIN FINAL DRIVE

TECHNICAL FIELD

This disclosure related to the field of automotive transmissions. More particularly, the disclosure relates to a transaxle having a chain final drive assembly that provides both axis transfer and torque multiplication.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Figure 1:
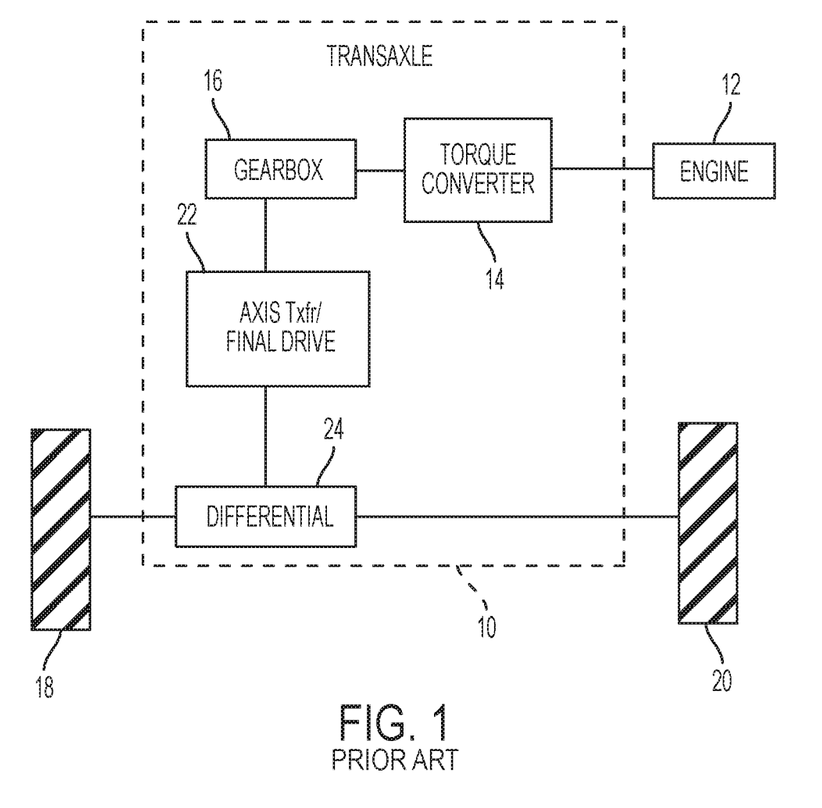
FIG. 1 is a schematic representation of a vehicle powertrain.

FIG. 1 depicts a typical front wheel drive transaxle 10. Flow of mechanical power is shown by solid lines. Power is provided by internal combustion engine 12. The crankshaft of engine 12 drives torque converter 14. Torque converter 14 permits the engine to idle while the vehicle is stationary. Torque converter 14 transmits the power to gearbox 16. In some operating conditions, torque converter 14 may decrease shaft speed and increase shaft torque. Gearbox 14 adjusts the speed and torque according to current vehicle requirements. Engine 12, torque converter 14, and gearbox 16 are situated on a common axis offset from the axis about which the front wheels 18 and 20 rotate. Transaxle 10 includes axis transfer components 22 to transfer power from gearbox 16 to differential 24, which is located approximately on the wheel rotation axis. These components may also multiply the torque by a final drive ratio. Differential 24 transmits the power to left and right wheels 18 and 20 while permitting slight speed differences when the vehicle turns a corner.

SUMMARY

According to a first embodiment, a transmission includes a chain engaging first and second sprockets. The first sprocket is supported for rotation about a front support by needle bearings which may roll directly on the front support. The second sprocket is bolted to a differential carrier for rotation therewith. The transmission may also include a turbine shaft supported by the front support. The front support may define first through fourth channels. The first channel may be in fluid communication with an axial channel within the turbine shaft. The second channel may be in fluid communication with a channel defined between the front support and the turbine shaft. The third channel may be fluidly connected to an outer surface of the front support body. The fourth channel may be fluidly connected to a space between the turbine shaft and a turbine shaft insert. The transmission may also include a cast intermediate member fixed to the front support, a bell housing, and a valve body and having channels fluidly connecting the first and second channels of the front support to the valve body. The front support may include a front support body and a front support insert. The front support body may be configured to support the turbine shaft. The front support insert may be fixed to the front support body such that the first and channels go through both the front support body and the front support insert. The transmission may also include a planetary gear set having a sun gear supported for rotation around a portion of the first sprocket, a carrier splined to the first sprocket, a ring gear, and a plurality of planet gears supported for rotation with respect to the carrier and in meshing engagement with the sun gear and the ring gear. A shell may be fixedly coupled to the sun gear and extend between the planetary gear set and the chain. A brake may selective hold the shell against rotation. A park gear may be fixedly coupled to the first sprocket or to the second sprocket.

According to a second embodiment, a transmission includes a bell housing, an intermediate member, a front support body, and a front support insert. The intermediate member is fixed to the bell housing. The front support body is fixed to the intermediate member and is configured to support a turbine shaft. The front support insert is fixed to the front support body and is configured to support a first sprocket. The intermediate member, front support body, front support insert, and turbine shaft define at least two fluid passageways from a valve body to a torque converter. A second sprocket may be bolted to a differential carrier for rotation therewith. A chain may engage the first and second sprockets.

A transmission front support includes a front support body and a hollow front support insert. The front support body is configured to support a turbine shaft. The hollow front support insert is fixed to the front support body and is configured to support a first sprocket. The front support body, front support insert, and turbine shaft define four fluid passageways each fluidly connecting an intermediate member to a torque converter.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A group of rotatable elements are fixedly coupled to one another if they are constrained to rotate at the same speed about the same axis in all operating conditions. Rotatable elements may be fixedly coupled by, for example, spline connections, welding, press fitting, or machining from a common solid. Slight variations in rotational displacement between fixedly coupled elements may occur such as displacement due to lash or shaft compliance. In contrast, two rotatable elements are selectively coupled by a shift element when the shift element constrains them to rotate at the same speed about the same axis whenever the shift element is fully engaged and the rotatable elements are free to rotate at distinct speeds in at least some other operating condition. A shift element that holds a rotatable element against rotation by selectively connecting it to the housing is called a brake. A shift element that selectively couples two or more rotatable elements to one another is called a clutch. Shift elements may be actively controlled devices such as hydraulically or electrically actuated clutches or brakes or may be passive devices such as one way clutches or brakes. Two rotatable elements are coupled if they are either fixedly coupled or selectively coupled.

Figure 2:
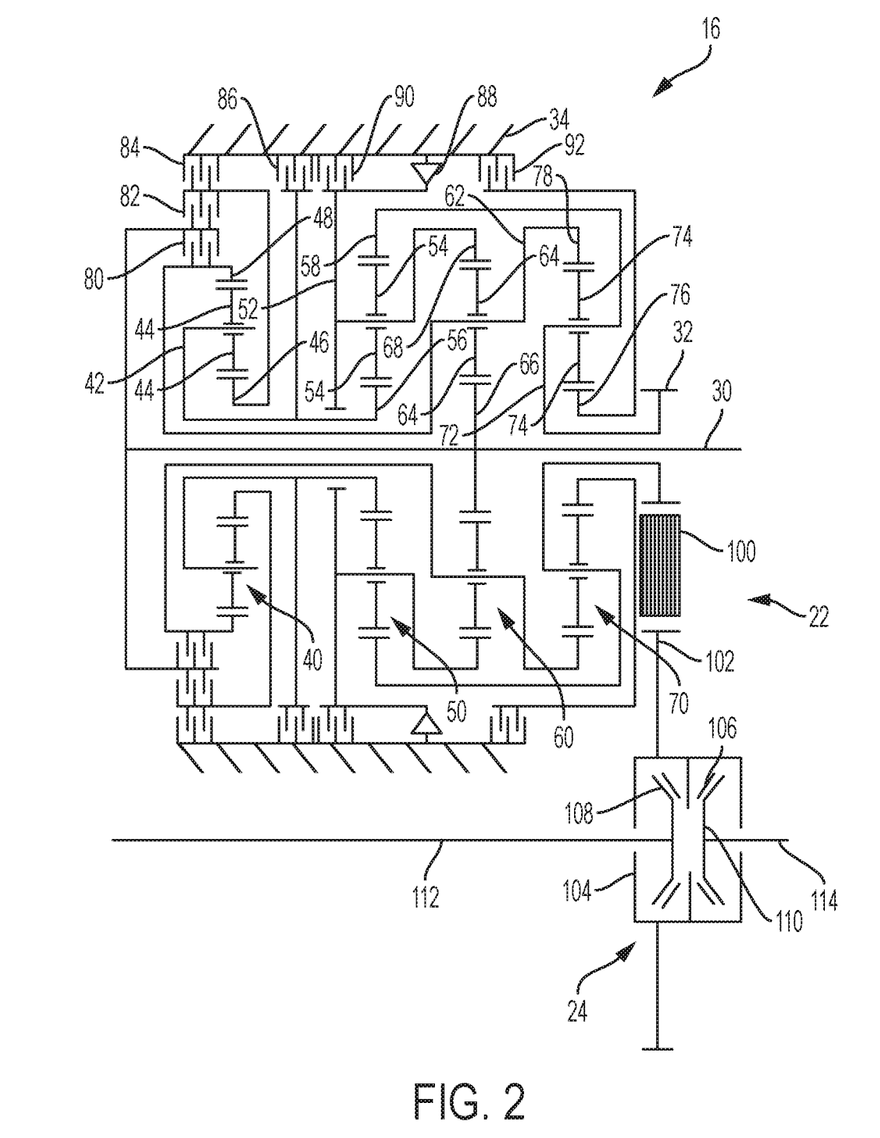
FIG. 2 is a schematic representation of a transaxle suitable for use in the powertrain of FIG. 1.

FIG. 2 schematically depicts a gearbox 16, axis transfer components 22, and differential 26. This gearing arrangement provides a variety of fixed speed ratios between turbine shaft 30 and first sprocket 32. Turbine shaft 30 is driven by the torque converter 14.

The transaxle of FIG. 2 utilizes four simple planetary gear sets 40, 50, 60, and 70. A planet carrier 42 rotates about a central axis and supports a set of planet gears 44 such that the planet gears rotate with respect to the planet carrier. External gear teeth on the planet gears mesh with external gear teeth on a sun gear 46 and with internal gear teeth on a ring gear 48. The sun gear and ring gear are supported to rotate about the same axis as the carrier. Gear sets 50, 60, and 70 are similarly structured. Turbine shaft 30, first sprocket 32, and gear sets 40, 50, 60, and 70 are all supported within transaxle housing 34. A suggested ratio of gear teeth for each planetary gear set is listed in Table 1.

TABLE 1

| Ring 48/Sun 46 | 1.83 |
|---|---|
| Ring 58/Sun 56 | 2.257 |
| Ring 68/Sun 66 | 2.70 |
| Ring 78/Sun 76 | 2.35 |

Sun gear 66 is fixedly coupled to turbine shaft 30. Ring gear 58 and carrier 72 are fixedly coupled to first sprocket 32. Ring gear 48, carrier 62, and ring gear 78 are mutually fixedly coupled. Carrier 42 is fixedly coupled to sun gear 56. Carrier 52 is fixedly coupled to ring gear 68. Turbine shaft 30 is selectively coupled to ring gear 48 by clutch 80. Sun gear 46 is selectively coupled to turbine shaft 30 by clutch 82 and selectively held against rotation by brake 84. Carrier 42 and sun gear 56 are selectively held against rotation by brake 86. One way brake 88 permits carrier 52 to rotate in one direction but prevents rotation in the opposite direction. Brake 90 selectively holds carrier 52 against rotation in either direction. Finally, brake 92 selectively holds sun gear 76 against rotation.

As shown in Table 2, engaging the shift elements in specified combinations establishes eight forward speed ratios and one reverse speed ratio between turbine shaft 30 and first sprocket 32. An X indicates that the shift element is required to establish the speed ratio. When the gear sets have tooth numbers as indicated in Table 1, the speed ratios have the values indicated in Table 2. In 1st gear, the transmission transfers power from turbine shaft 30 to first sprocket 32 but one way brake 88 overruns to prevent transfer of power in the opposite direction. The M1 state has the same speed ratio as 1st gear, but is capable of transferring power in either direction.

TABLE 2

|     | 80 | 82 | 84 | 86 | 90 | 92 | Ratio | Step |
|-----|----|----|----|----|----|----|-------|------|
| Rev |    | X  |    | X  |    |    | -4.27 | 81%  |
| M1  |    |    |    |    | X  | X  | 5.27  |      |
| 1st |    |    |    |    |    | X  | 5.27  |      |
| 2nd |    |    |    | X  |    | X  | 3.40  | 1.55 |
| 3rd |    |    | X  |    |    | X  | 2.64  | 1.29 |
| 4th |    | X  |    |    |    | X  | 2.04  | 1.29 |
| 5th | X  |    |    |    |    | X  | 1.43  | 1.43 |
| 6th | X  | X  |    |    |    |    | 1.00  | 1.43 |
| 7th | X  |    | X  |    |    |    | 0.87  | 1.16 |
| 8th | X  |    |    | X  |    |    | 0.69  | 1.25 |

Chain 100 wraps around and engages first sprocket 32 and second sprocket 102. Second sprocket 102 is fixedly coupled to the carrier 104 of differential 24. Second sprocket 102 is approximately 2.5 times larger in diameter than first sprocket 32. Therefore, the chain and sprocket assembly provides both the final drive ratio torque multiplication and the axis transfer functions. A number of beveled planet gears 106 are supported for rotation with respect to carrier 104. Each planet gear meshes with both left and right beveled side gears 108 and 110 respectively. Left beveled side gear 108 is fixedly coupled to left half-shaft 112 while right beveled side gear 110 is fixedly coupled to right half-shaft 114. Other types of differential gearing are known and may be substituted, such as a differential based on a double pinion planetary gear set with helical gears instead of bevel gears.

Compared to a transaxle that uses a final drive planetary gear set to provide torque multiplication and a chain and sprocket assembly for axis transfer, this arrangement offers several advantages. First, the mesh losses associated with the planetary gear set are eliminated. Elimination of the planetary gear set also reduces cost and space requirements. The chain and sprocket assembly has lower losses than a layshaft gear type final drive assembly.

Figure 3:
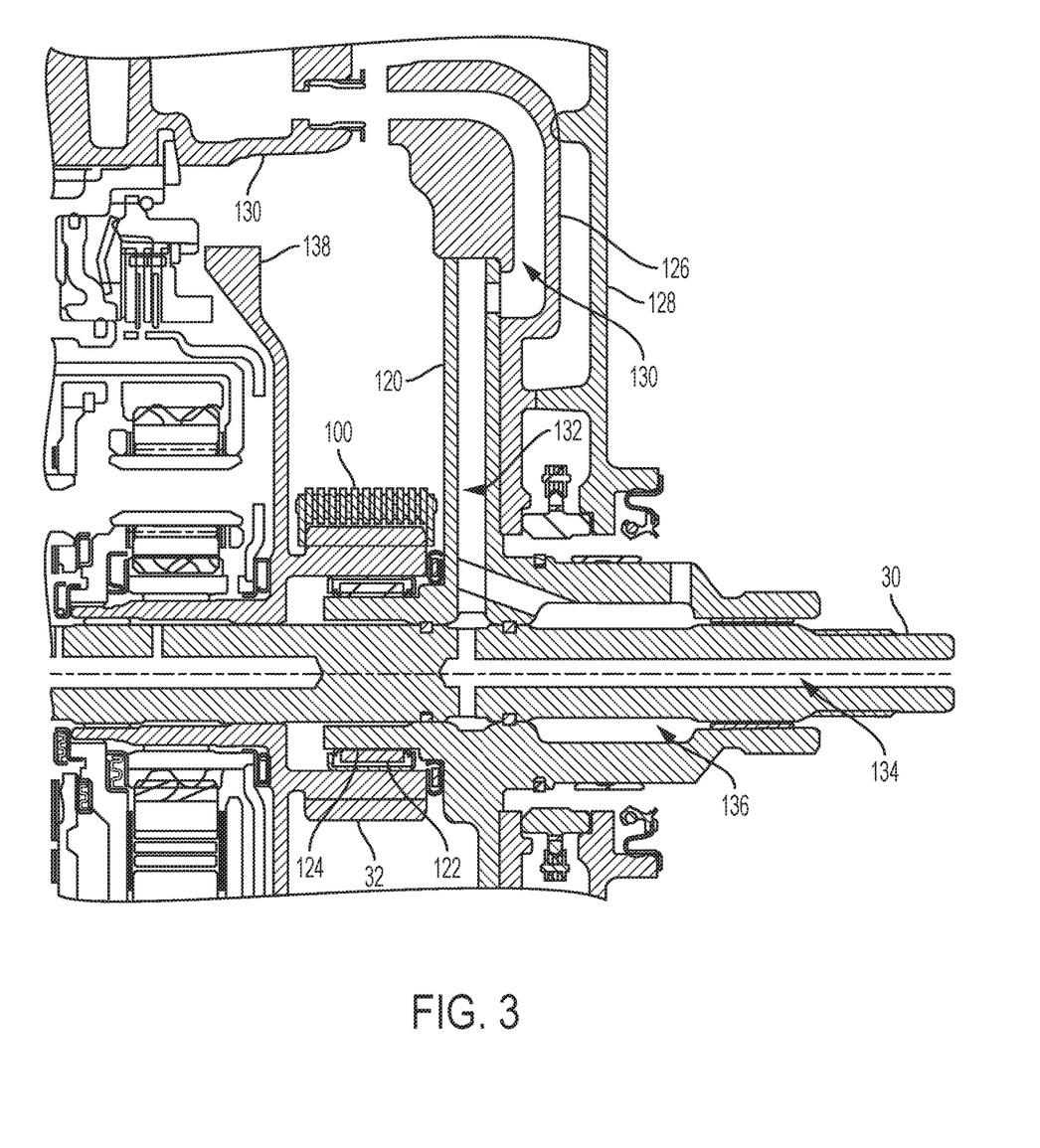
FIG. 3 is a partial cross sectional view of a first embodiment of the transaxle of FIG. 2 showing the front support, driving final drive sprocket, and park gear.

FIG. 3 shows a partial cross section of a first embodiment of a transmission according to the schematic of FIG. 2. Generating enough final drive ratio with a chain and sprockets requires the first sprocket 32 to be small in diameter. However, it is still important that the sprocket be properly supported. Turbine shaft 30 is supported by front support 120. First sprocket 32 is also supported by front support 120 via bearing 122. Conventionally, a bearing would include inner and outer races press fit into the rotating part in addition to the rolling elements themselves. These races require radial space. Front support 120 is machined from steel such that it is stronger and more dimensionally accurate than a cast part. An outer surface 124 of front support 120 is heat treated and machined to a surface finish that permits it to be the inner race for roller bearing 122. This reduces the inner diameter of first sprocket 32 which permits reducing the pitch diameter of first sprocket 32.

Front support 120 is attached to intermediate member 126 which is attached, in turn, to bell housing 128 and transmission valve body 130. The valve body 130 may be attached to transmission housing 34. Use of intermediate member 126 minimizes the size and cost of front support 120. Intermediate member 126 may be a cast part.

Fluid is provided from the valve body to torque converter 14 through two channels in intermediate member 126 and front support 120. Fluid flows into the torque converter through one of the channels and flows out of the torque converter through the other channel. A first portion 130 of one of these channels is formed into intermediate member 126. A second portion 132 of the channel is formed in front support 120. The second of the two channels is formed similarly at a different circumferential location. A hole 134 is drilled axially in turbine shaft 30. A radial hole connects this axial hole to one of the channels in center support 120. The other channel is connected to a gap 136 between center support 120 and turbine shaft 32. In order to engage a torque converter lock-up clutch, the pressure difference between the two channels is reversed.

Park gear 138 is integrally formed with sprocket 32. To engage park, a parking mechanism forces a parking pawl into engagement with park gear 138, holding sprocket 32 stationary. This, in turn, holds differential carrier 104 stationary.

Figure 4:
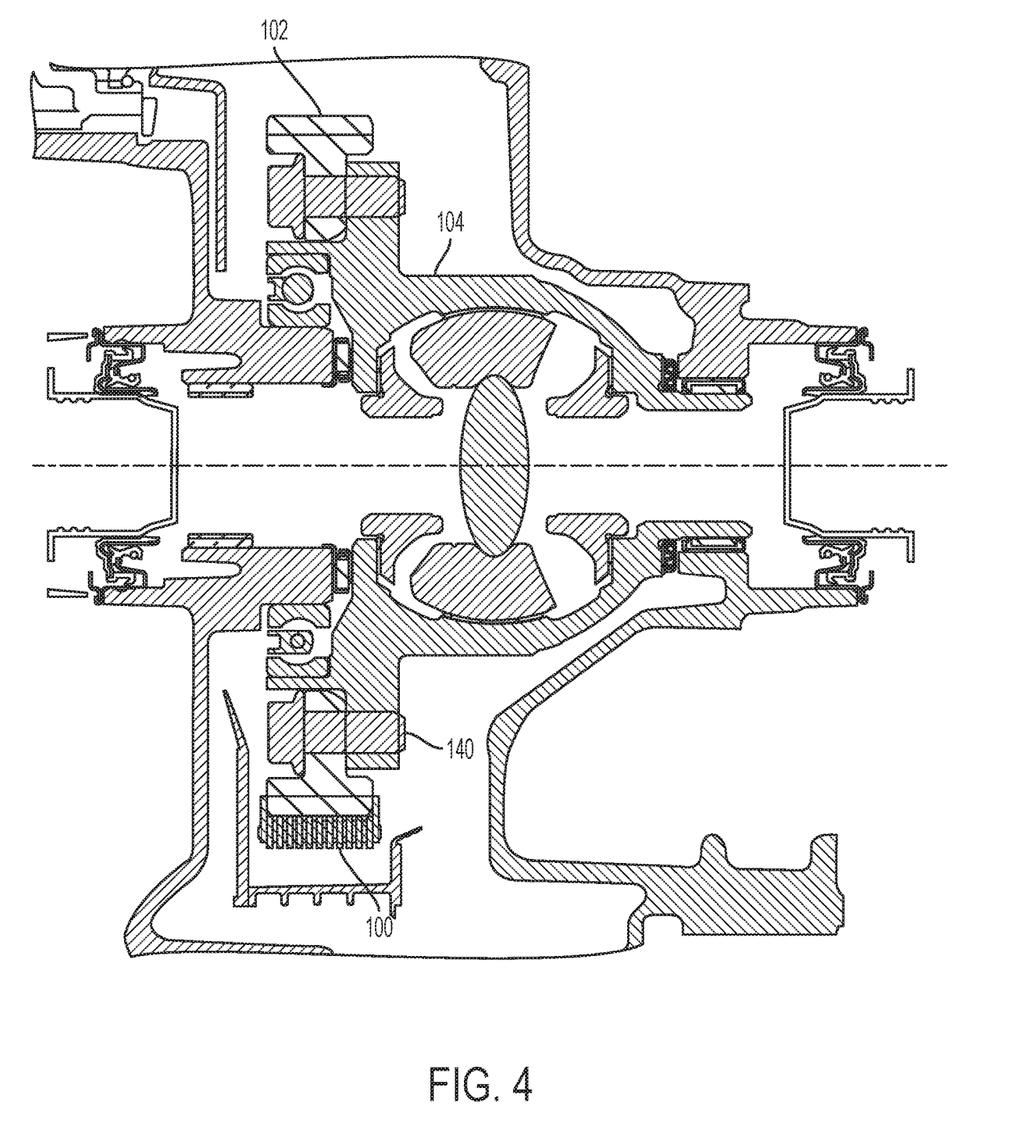
FIG. 4 is a partial cross sectional view of the first embodiment of the transaxle of FIG. 2 showing the differential and driven final drive sprocket.

FIG. 4 shows another partial cross section of the first embodiment of a transmission according to the schematic of FIG. 2, focusing on the differential axis. Second sprocket 102 is fixedly coupled to differential carrier 104 by bolt 140. Chain 100 continuously engages second sprocket 102.

Figure 5:
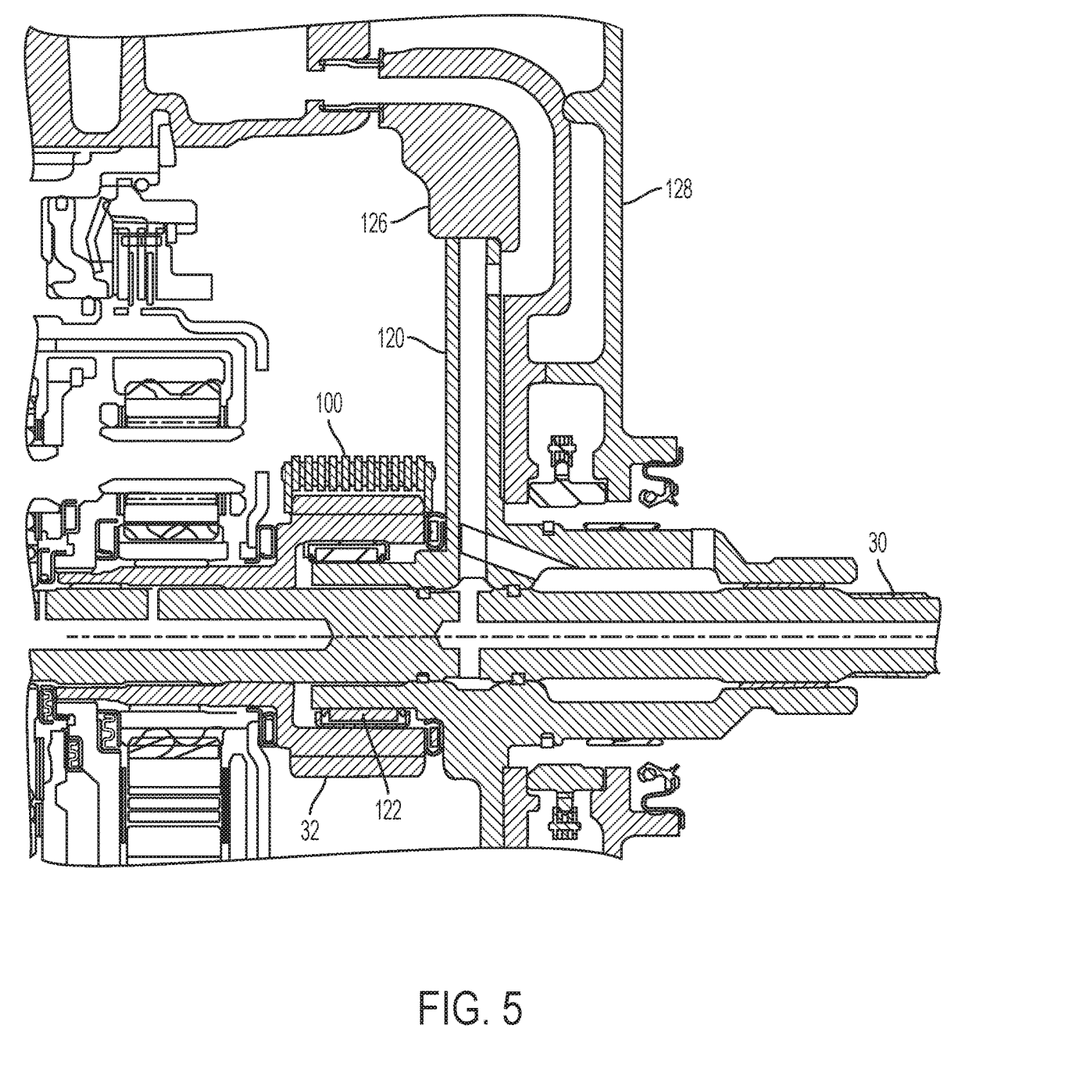
FIG. 5 is a partial cross sectional view of a second embodiment of the transaxle of FIG. 2 showing the front support and driving final drive sprocket.
Figure 6:
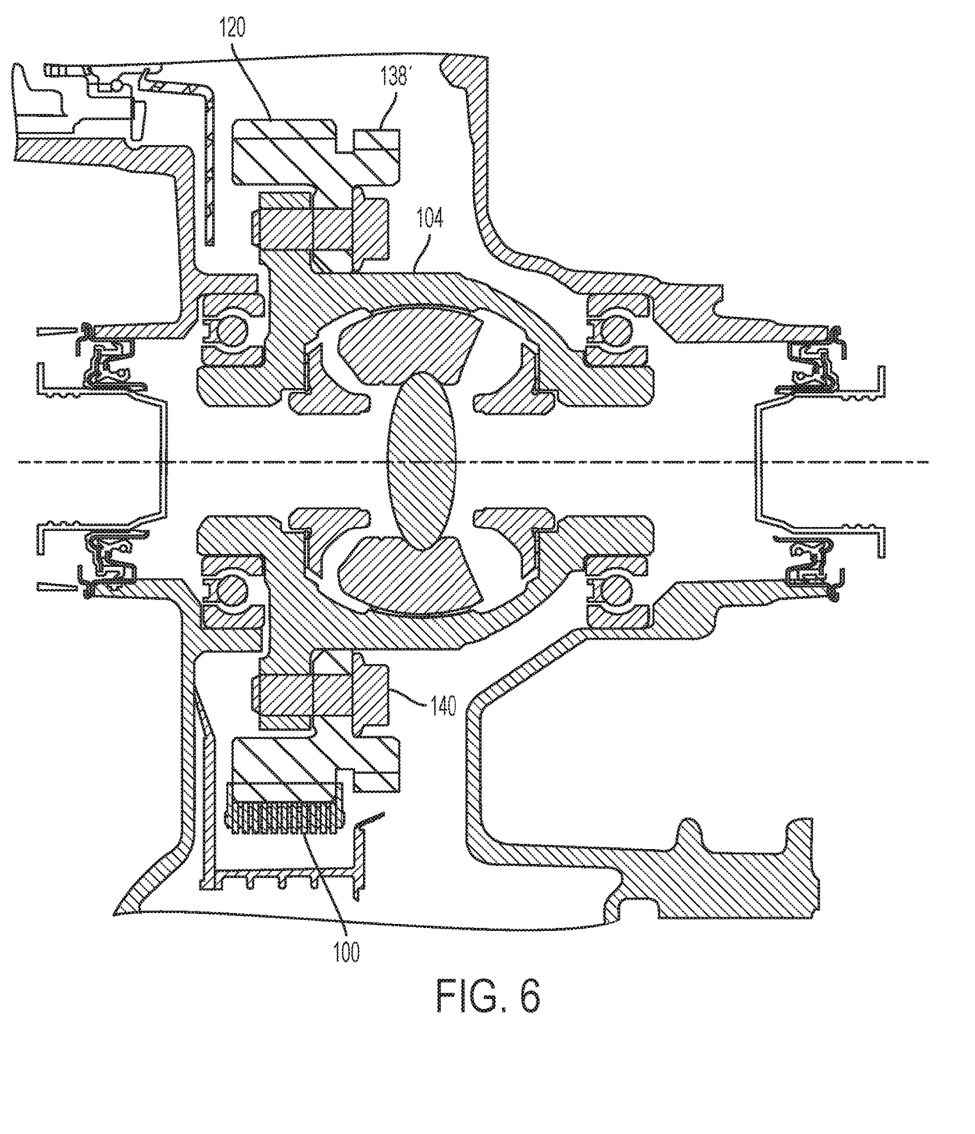
FIG. 6 is a partial cross sectional view of the second embodiment of the transaxle of FIG. 2 showing the differential, driven final drive sprocket, and park gear.

FIGS. 5 and 6 show partial cross sections of a second embodiment of a transmission according to the schematic of FIG. 2. In this embodiment, park gear 138' is integrally formed with second sprocket 102 rather than with first sprocket 32. Placing the park gear on the differential axis offers several advantages. The axial length of the transmission along the main axis is reduced. Although the axial length along the differential axis may be increased relative to the first embodiment, it is still much shorter than a transmission having a final drive planetary on the differential axis. Furthermore, the chain and sprockets are not park-critical components. Failure of the chain or one of the sprockets would not allow the vehicle to roll while Park is engaged. The maximum distance that the vehicle can move with park engaged must be tightly controlled. Lash in the chain and sprocket mechanism will not contribute to this distance.

Figure 7:
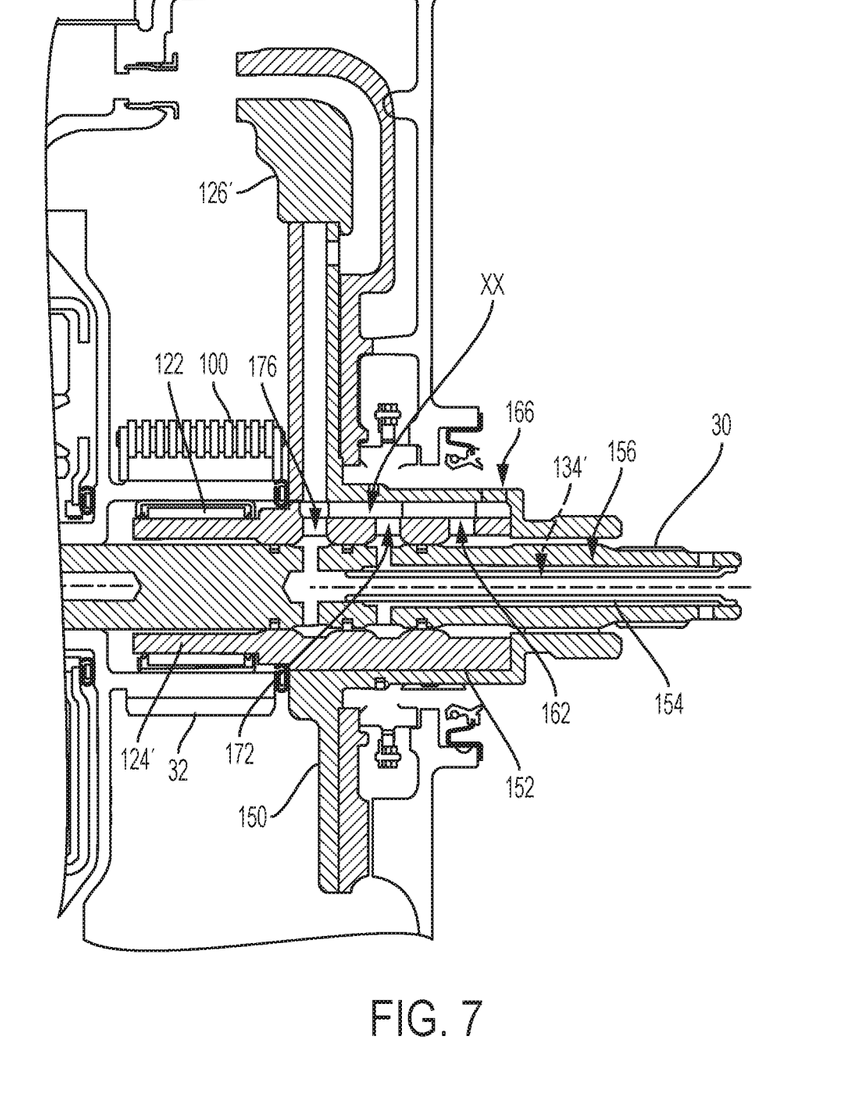
FIG. 7 is a partial cross sectional view of a third embodiment of the transaxle of FIG. 2 showing the front support and turbine shaft adapted to provide four fluid passageways to a torque converter.
Figure 8:
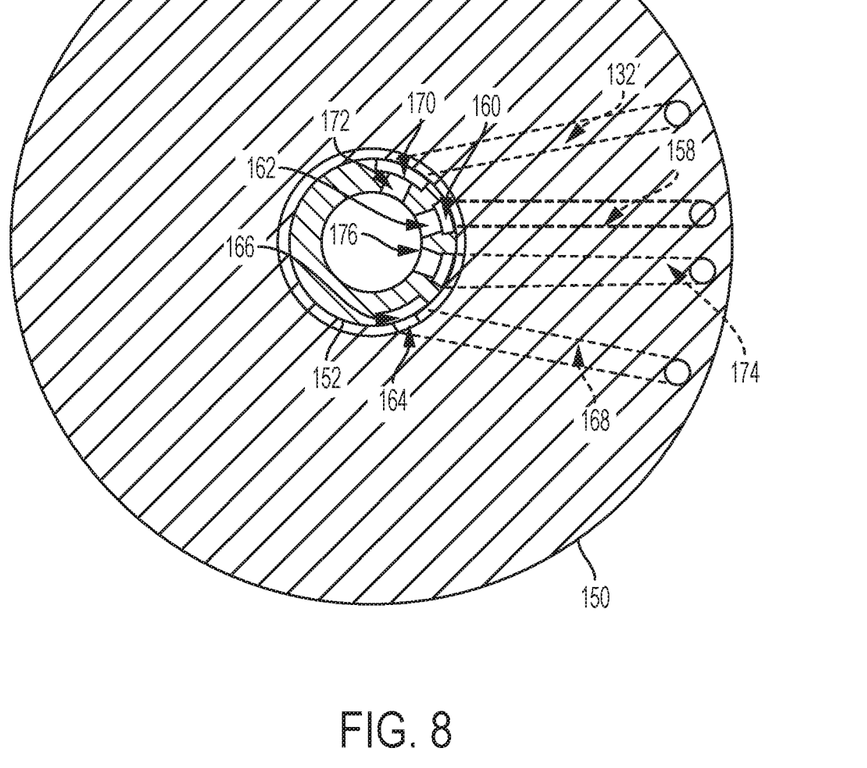
FIG. 8 is an end view of the front support of the third embodiment.

FIGS. 7 and 8 illustrate an embodiment suitable for a transmission having a four-pass torque converter. In a four-pass torque converter, control of the torque converter lock-up clutch is independent of provision of fluid to the hydrodynamic elements. Additional passageways conduct fluid to an apply chamber and a balance chamber. The fluid supplied to the balance chamber is maintained at close to ambient pressure. The pressure of the fluid supplied to the apply chamber is adjusted by the controller to set the torque capacity of the lock-up clutch. The torque capacity of the lock-up clutch is based on the pressure difference between the apply chamber and the balance chamber. In a three-pass torque converter, the balance chamber is supplied with fluid leaving the hydro-dynamic chamber. The pressure of this fluid can vary in response to actions such as stroking of shifting clutches, making accurate control of lock-up clutch torque capacity more challenging.

The embodiment of FIGS. 7 and 8 provides four separate fluid passageways between the valve body and the torque converter. Whereas front support 120 of FIGS. 3 and 5 was formed in a single piece, the front support of FIGS. 7 and 8 is formed in two pieces: front support body 150 and front support insert 152. A hollow input shaft insert 154 is installed into the input shaft to create two channels: 134' on the interior of the input shaft insert and 156 between the exterior of the input shaft insert and the input shaft 30. Outer surface 124' of front support insert 152 is machined to serve as the inner race for bearing 122.

Fluid is routed to the hydrodynamic chamber via channel 158 in front support body 150, axial channel 160, radial channel 162 in front support insert 152, and an axial channel between the front support and input shaft 30. Fluid is returned from the hydrodynamic chamber via radial channel 164 in front support body 150, axial channel 166, and channel 168 in front support body 150. Fluid is supplied to the lock-up clutch apply chamber via channel 132' in front support body 150, axial channel 170, radial channel 172 in front support insert 152, and channel 156. Radial channels in input shaft 30 connect channel 172 to channel 156 and connect channel 156 to the torque converter turbine housing. Axial channels 160, 166, and 170 are formed between front support body 150 and front support insert 152. Fluid is supplied to the lock-up clutch balance chamber via channel 174 in front support body 150, radial channel 176 in front support insert 152, and axial channel 134' in input shaft 30.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A transmission comprising:
a front support including a sleeve portion having an outer circumferential surface configured as an inner bearing race;
a first sprocket defining an inner circumferential surface that circumscribes the sleeve portion;
a roller bearing radially disposed between the inner and outer circumferential surfaces to supported the first sprocket for rotation about the sleeve portion, the roller bearing including an outer race seated against the inner circumferential surface and roller elements that ride directly on the outer circumferential surface;
a second sprocket bolted to a differential carrier for rotation therewith; and
a chain engaging the first and second sprockets.

2. The transmission of claim 1 further comprising a turbine shaft supported by the front support, the front support defining a first channel in fluid communication with an axial channel within the turbine shaft and defining a second channel in fluid communication with a channel defined between the front support and the turbine shaft.

3. The transmission of claim 2 further comprising a cast intermediate member fixed to the front support, a bell housing, and a valve body and having channels fluidly connecting the first and second channels of the front support to the valve body.

4. The transmission of claim 3 wherein the front support comprises:
a front support body configured to support the turbine shaft; and a front support insert fixed to the front support body such that the first and second. channels go through. both the front support body and the front support insert.

5. The transmission of claim 4 wherein the front support further defines third and fourth channels, the third channel fluidly connected to an outer surface of the front support body and the fourth channel fluidly connected to a space between the turbine shaft and a turbine shaft insert.

6. The transmission of claim 1 further comprising a planetary gear set having a sun gear supported for rotation around a portion of the first sprocket, a carrier splined to the first sprocket, a ring gear, and a plurality of planet gears supported for rotation with respect to the carrier and in meshing engagement with the sun gear and the ring gear.

7. The transmission of claim 6 further comprising a shell fixedly coupled to the sun gear and extending between the planetary gear set and the chain.

8. The transmission of claim 7 further comprising a brake configured to selectively hold the shell against rotation.

9. The transmission of claim 1 further comprising a park gear fixedly coupled to the first sprocket.

10. The transmission of claim 1 further comprising a park gear fixedly coupled to the second sprocket.

11. The transmission. of claim 1 wherein the roller elements are needle bearings.

12. A transmission comprising:
a bell housing;
an intermediate member fixed to the bell housing;
a front support body fixed to the intermediate member and configured to support a turbine shaft; and
a front support insert fixed to the front support body and configured to support a first sprocket; and
wherein the intermediate member, front support body, front support insert, and turbine shaft define two fluid passageways from a valve body to a torque converter.

13. The transmission of claim 12 further comprising:
a second sprocket bolted to a differential carrier for rotation therewith; and
a chain engaging the first and second sprockets.

14. The transmission of claim 12 Wherein a first of the two fluid passageways comprises:
a first radial channel in the front support body;
a second radial channel in the front support insert;
a third radial channel in the turbine shaft; and
an axial channel in the turbine shaft.

15. The transmission of claim 12 wherein a second of the two fluid passageways comprises:
a second radial channel in the front support body;
a first axial channel defined between the front support body and the front support insert;
a second radial channel in the front support insert; and
an axial channel defined between the turbine shaft and the front support body.

16. The transmission of claim 12 wherein the intermediate member, front support body, front support insert, and turbine shaft define a third fluid passageway from the valve body to the torque converter comprising:
a third radial channel in the front support body;
a second axial channel defined between the front support body and the front support insert;
a third radial channel in the front support insert;
a second radial channel in the turbine shaft;
an axial channel defined between the turbine shaft and a turbine shaft insert; and
a third radial channel in the turbine shaft.

17. The transmission of claim 12 wherein the intermediate member, front support body, front support insert, and turbine shaft define a fourth fluid passageway from the valve body to the torque converter comprising:
a fourth radial channel in the front support body; and
a third axial channel defined between the front support body and the front support insert.

18. A transmission front support comprising:
a front support body configured to support a turbine shaft; and
a hollow front support insert fixed to the front support body and configured to support a first sprocket; and
wherein the front support body, front support insert, and turbine shaft define four fluid passageways each fluidly connecting an intermediate member to a torque converter.

19. The transmission front support of claim 18 wherein the four fluid passageways include:
four radial channels in the front support body at four different circumferential positions;
three axial channels defined between the front support body and the front support insert luidly connected to three of the four radial channels in the front support;
three radial channel through. the front support insert including one fluidly connected to a fourth of the four radial channels in the front support body and two fluidly connected to two of the three axial channels; and
a fifth axial channel in the front support body fluidly connecting an exterior surface of the front support body to a third of the three axial channels.

\* \* \* \* \*